US011630001B2

(12) United States Patent
Jupudi et al.

(10) Patent No.: US 11,630,001 B2
(45) Date of Patent: Apr. 18, 2023

(54) APPARATUS FOR MEASURING TEMPERATURE IN A VACUUM AND MICROWAVE ENVIRONMENT

(71) Applicant: APPLIED MATERIALS, INC., Santa Clara, CA (US)

(72) Inventors: Ananthkrishna Jupudi, Singapore (SG); Sai Kumar Kodumuri, Singapore (SG); Vinodh Ramachandran, Singapore (SG); Prashant Agarwal, Bangalore (IN); Hadi Bin Amir Muhammad, Singapore (SG)

(73) Assignee: APPLIED MATERIALS, INC., Santa Clara, CA (US)

( * ) Notice: Subject to any disclaimer, the term of this patent is extended or adjusted under 35 U.S.C. 154(b) by 165 days.

(21) Appl. No.: 17/073,733

(22) Filed: Oct. 19, 2020

(65) Prior Publication Data

US 2021/0172806 A1    Jun. 10, 2021

Related U.S. Application Data

(60) Provisional application No. 62/946,103, filed on Dec. 10, 2019.

(51) Int. Cl.
*G01K 1/16* (2006.01)
*G01K 13/00* (2021.01)
(Continued)

(52) U.S. Cl.
CPC .................. *G01K 1/16* (2013.01); *G01K 1/14* (2013.01); *G01K 11/20* (2013.01); *G01K 13/00* (2013.01)

(58) Field of Classification Search
USPC ......................................... 374/141, 161, 208
See application file for complete search history.

(56) References Cited

U.S. PATENT DOCUMENTS

| 5,556,204 A | 9/1996 | Tamura et al. |
| 5,775,808 A | 7/1998 | Pan |

(Continued)

FOREIGN PATENT DOCUMENTS

WO    WO-9641369 A1 * 12/1996 ....... H01L 21/67109

OTHER PUBLICATIONS

PCT International Search Report and Written Opinion for PCT/US2020/056446 dated Feb. 5, 2021.

*Primary Examiner* — Mirellys Jagan
(74) *Attorney, Agent, or Firm* — Moser Taboada (57) ABSTRACT

An apparatus for determining temperatures of substrates in microwave and/or vacuum environments. A substrate holder with a plurality of support pins includes a temperature sensor assembly with at least a portion of a surface with a phosphorous coating is configured to be inserted in at least one pin support position from an inner area of the substrate holder and in at least one pin support position from an outer area of the substrate holder. The temperature sensor assembly includes a temperature sensor pin with a spring that is microwave transparent. The temperature sensor pin is made of a material with a thermal conductivity greater than approximately 200 W/mK and a low thermal mass which is microwave transparent. An optical transmission assembly is embedded into at least a portion of the substrate holder to receive light emissions from a surface of the temperature sensor pin.

20 Claims, 4 Drawing Sheets

(51) Int. Cl.
*G01K 1/14* (2021.01)
*G01K 11/20* (2006.01)

(56) References Cited

U.S. PATENT DOCUMENTS

| | | | |
|---|---|---|---|
| 6,157,015 | A | 12/2000 | Gaisford et al. |
| 6,481,886 | B1* | 11/2002 | Narendrnath ..... H01L 21/67248 |
| | | | 374/161 |
| 2003/0209773 | A1* | 11/2003 | Lue ........................ G01K 11/20 |
| | | | 257/467 |
| 2006/0141806 | A1 | 6/2006 | Waldfried et al. |
| 2007/0064767 | A1* | 3/2007 | Graff ................. G01K 11/3213 |
| | | | 374/161 |
| 2009/0321432 | A1 | 12/2009 | Han et al. |
| 2015/0090708 | A1 | 4/2015 | Tanaka et al. |
| 2015/0201469 | A1 | 7/2015 | Shimomura |
| 2018/0261481 | A1* | 9/2018 | Eto ................... H01L 21/67288 |
| 2018/0306650 | A1 | 10/2018 | Garcia de Gorordo |
| 2018/0323092 | A1 | 11/2018 | Rao et al. |

\* cited by examiner

APPARATUS FOR MEASURING TEMPERATURE IN A VACUUM AND MICROWAVE ENVIRONMENT

CROSS-REFERENCE TO RELATED APPLICATIONS

This application claims benefit of U.S. provisional patent application Ser. No. 62/946,103, filed Dec. 10, 2019 which is herein incorporated by reference in its entirety.

FIELD

Embodiments of the present principles generally relate to temperature measurement of substrates in microwave and vacuum environments in semiconductor manufacturing processes.

BACKGROUND

Temperature plays an important part of semiconductor manufacturing for both transforming materials and also for removing moisture from materials. The process chambers, substrates, and gases used in semiconductor formation are all tightly controlled during processing. Different types of pyrometers may be used to read temperatures and are required to provide high accuracy, especially when measuring the temperature of substrates. However, when encountering harsh environments such as heating chambers that use microwaves, typical pyrometers fall short in the ability to properly measure temperature in harsh environments. When microwave or vacuum environments are utilized, the harsh environments usually prohibit accurate temperature measurements of substrates.

Thus, the inventors have provided improved methods and apparatus for measuring substrate temperatures in microwave and/or vacuum cavities.

SUMMARY

Apparatus for measuring temperatures of substrates in microwave and/or vacuum environments are provided herein.

In some embodiments, an apparatus for determining a temperature of a substrate may comprise a substrate holder with a plurality of support pins configured to be placed in a microwave or vacuum environment, a temperature sensor assembly with at least a portion of a surface with a phosphorous coating and configured to be inserted in at least one pin support position, and an optical transmission assembly embedded into at least a portion of the substrate holder and configured to receive light emissions from the at least a portion of the surface of the temperature sensor assembly and to relay the light emissions to a temperature detection assembly.

In some embodiments, the apparatus may further include wherein the substrate holder is configured to be static during temperature measurements, wherein the substrate holder is configured to rotate during temperature measurements, wherein the temperature sensor assembly includes a temperature sensor pin with a spring that provides upward motion of the temperature sensor pin and is configured to enhance thermal contact with a warped substrate when present by providing an upward force against the substrate, wherein the spring is a microwave transparent material, wherein the spring is made of a microwave transparent material that may include a ceramic material, wherein the temperature sensor pin has a slot through a lower portion of the temperature sensor pin and is configured to be held in the substrate holder by a locking pin that inserts through the slot of the temperature sensor pin, wherein the locking pin is a microwave transparent material, wherein the locking pin is made of a microwave transparent material that may include a ceramic material, wherein the temperature sensor pin is made of a material with a thermal conductivity greater than approximately 200 W/mK and a low thermal mass which is microwave transparent, wherein the at least a portion of the surface of the temperature sensor assembly includes a side surface of the temperature sensor assembly, wherein the at least a portion of the surface of the temperature sensor assembly includes a bottom surface of the temperature sensor assembly, wherein the optical transmission assembly is configured to intermittently obtain light emissions from the temperature sensor assembly, and/or wherein the substrate holder and temperature sensor assembly are configured to be mounted on a rotating platform and the optical transmission assembly is configured to be mounted on a static platform, wherein the temperature sensor assembly is configured to pass over the optical transmission assembly as the substrate holder rotates.

In some embodiments, an apparatus for determining a temperature of a substrate may include a substrate holder with a plurality of support pins configured to be placed in a microwave environment or a vacuum environment, a temperature sensor assembly with at least a portion of a surface with a phosphorous coating and configured to be inserted in at least one pin support position from an inner area of the substrate holder and in at least one pin support position from an outer area of the substrate holder, wherein the temperature sensor assembly includes a temperature sensor pin with a spring that is microwave transparent and provides an upward motion of the temperature sensor pin and is configured to enhance thermal contact with a warped substrate when present by providing an upward force against the substrate, and wherein the temperature sensor pin is made of a material with a thermal conductivity greater than approximately 200 W/mK and a low thermal mass which is microwave transparent, and an optical transmission assembly embedded into at least a portion of the substrate holder and configured to receive light emissions from the at least a portion of the surface of the temperature sensor assembly and to relay the light emissions to a temperature detection assembly.

In some embodiments, the apparatus may further include wherein the substrate holder and temperature sensor assembly are configured to be mounted on a rotating platform and the optical transmission assembly is configured to be mounted on a static platform, wherein the temperature sensor assembly is configured to pass over the optical transmission assembly as the substrate holder rotates, wherein the temperature sensor pin has a slot through a lower portion of the temperature sensor pin and is configured to be held in the substrate holder by a locking pin that inserts through the slot of the temperature sensor pin, wherein the locking pin is made of a microwave transparent material, and/or wherein the at least a portion of the surface of the temperature sensor assembly includes a side surface of the temperature sensor assembly or a bottom surface of the temperature sensor assembly.

In some embodiments, an apparatus for heating a substrate with microwaves may comprise a process chamber with a microwave power source and a microwave cavity, the process chamber capable of providing a vacuum environment for heating the substrate, a plurality of substrate holders with a plurality of support pins configured to be placed in the microwave cavity, the plurality of substrate holders configured to support a plurality of substrates, at least one temperature sensor assembly with at least a portion of a surface with a phosphorous coating and configured to be inserted in at least one pin support position in at least one of the plurality of substrate holders, at least one optical transmission assembly embedded into at least a portion of the at least one of the plurality of substrate holders and configured to receive light emissions from the at least a portion of the surface of the temperature sensor assembly and to relay the light emissions to a temperature detection assembly, and a controller configured to receive temperature information from the temperature detection assembly and to provide adjustments to the microwave power source based upon the temperature information and process information.

In some embodiments, the apparatus may further include wherein the process chamber is configured to process and determine temperatures of the plurality of substrates when at least one of the plurality of substrates is composed of a different material than another one of the plurality of substrates.

Other and further embodiments are disclosed below.

BRIEF DESCRIPTION OF THE DRAWINGS

Embodiments of the present principles, briefly summarized above and discussed in greater detail below, can be understood by reference to the illustrative embodiments of the principles depicted in the appended drawings. However, the appended drawings illustrate only typical embodiments of the principles and are thus not to be considered limiting of scope, for the principles may admit to other equally effective embodiments.

To facilitate understanding, identical reference numerals have been used, where possible, to designate identical elements that are common to the figures. The figures are not drawn to scale and may be simplified for clarity. Elements and features of one embodiment may be beneficially incorporated in other embodiments without further recitation.

DETAILED DESCRIPTION

The apparatus provide temperature measurements for substrates independent of the substrate material and in harsh environments, such as in microwave and/or vacuum cavities for substrate independent proportional-integral-derivative (PID) temperature control. The apparatus are transparent to microwaves and may be utilized in environments ranging from ultra-high vacuum to atmospheric conditions. Temperature measurements may be advantageously taken in vacuum environments where fiber optic devices cannot be used and are not limited by substrate materials as are infrared (IR) sensors and the like. The apparatus may also be beneficially utilized to determine temperature based on multiple points in a substrate and/or multiple wafers in a stack to provide holistic heating patterns of the substrate stack. Temperatures may also be determined for substrate stacks with a mixture of substrate materials in one setting. The apparatus may also be used with static substrates as well as with rotating (non-static) substrates. Because the apparatus is material independent, the apparatus can be used to measure substrates formed from silicon, glass, epoxy, and the like.

In some embodiments, a temperature sensor assembly used to measure temperature is also used for supporting a substrate and has a temperature sensor pin which is made of material that has a low thermal mass and high thermal conductivity such as, but not limited to, polyether ether ketone (PEEK), aluminum nitride, or silicon nitride, and the like which aids in proper heat transfer in vacuum and/or microwave environments as well. The height of the temperature sensor pin may be the same height of support pins that support the substrate or different. The temperature sensor assembly may have a spring mechanism that allows for vertical motion and may make the temperature sensor pin proud of the support pins to ensure good thermal contact with a substrate, especially when the substrate is warped. In some embodiments, the temperature sensor assembly may be used in a substrate drying chamber and have a temperature sensor pin formed of a material that does not attract moisture such as, but not limited to, a PEEK material that is also microwave transparent.

Figure 1:
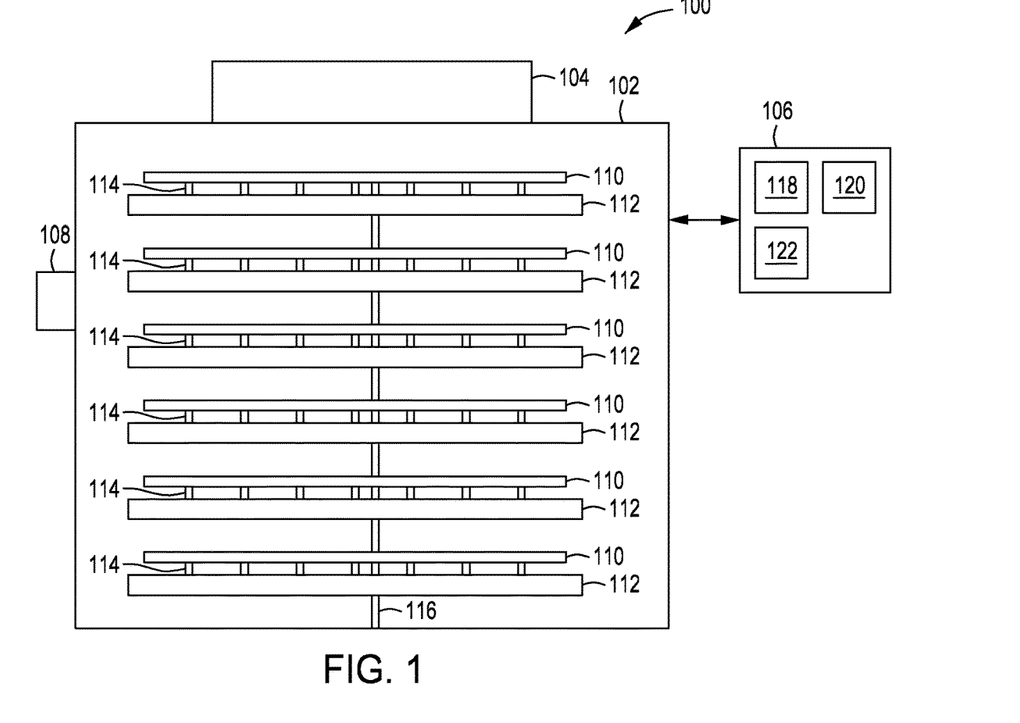
FIG. 1 depicts cross-sectional view of a substrate heating system in accordance with some embodiments of the present principles.

The apparatus of the present principles may be utilized in vacuum environments as well as microwave environments. The apparatus is not limited to one type of process chamber. In the interest of brevity, the apparatus will be described in an example that utilizes a substrate heating or drying chamber. FIG. 1 depicts a cross-sectional view of a substrate heating system 100 in accordance with some embodiments. The substrate heating system 100 includes a process chamber 102, a microwave source 104, and a controller 106. The process chamber 102 also includes a slit valve 108 for moving substrates in and out of the process chamber 102. In some embodiments, the process chamber 102 accepts one or more substrates 110 for heating or drying. The one or more substrates 110 are held on one or more substrate holders 112 that hold the one or more substrates 110 on a plurality of support pins 114. The one or more substrate holders 112 are supported by one or more support members 116. The one or more support members 116 may support the one or more substrate holders 112 statically and/or may provide vertical motion to the one or more substrate holders 112 to aid in loading or unloading of the one or more substrates 110.

The controller 106 controls the operation of the substrate heating system 100 using a direct control or alternatively, by controlling the computers (or controllers) associated with the substrate heating system 100. In operation, the controller 106 enables data collection and feedback to optimize performance of the substrate heating system 100. The controller 106 generally includes a Central Processing Unit (CPU) 118, a memory 120, and a support circuit 122. The CPU 118 may be any form of a general-purpose computer processor that can be used in an industrial setting. The support circuit 122 is conventionally coupled to the CPU 118 and may comprise a cache, clock circuits, input/output subsystems, power supplies, and the like. Software routines, such as a method as described above may be stored in the memory 120 and, when executed by the CPU 118, transform the CPU 118 into a specific purpose computer (controller 106). The software routines may also be stored and/or executed by a second controller (not shown) that is located remotely from the substrate heating system 100.

The memory 120 is in the form of computer-readable storage media that contains instructions, when executed by the CPU 118, to facilitate the operation of the semiconductor processes and equipment. The instructions in the memory 120 are in the form of a program product such as a program that implements the apparatus of the present principles. The program code may conform to any one of a number of different programming languages. In one example, the disclosure may be implemented as a program product stored on a computer-readable storage media for use with a computer system. The program(s) of the program product define functions of the aspects. Illustrative computer-readable storage media include, but are not limited to: non-writable storage media (e.g., read-only memory devices within a computer such as CD-ROM disks readable by a CD-ROM drive, flash memory, ROM chips, or any type of solid-state non-volatile semiconductor memory) on which information is permanently stored; and writable storage media (e.g., floppy disks within a diskette drive or hard-disk drive or any type of solid-state random access semiconductor memory) on which alterable information is stored. Such computer-readable storage media, when carrying computer-readable instructions that direct the functions of the substrate heating system described herein, are aspects of the present principles.

Figure 2:
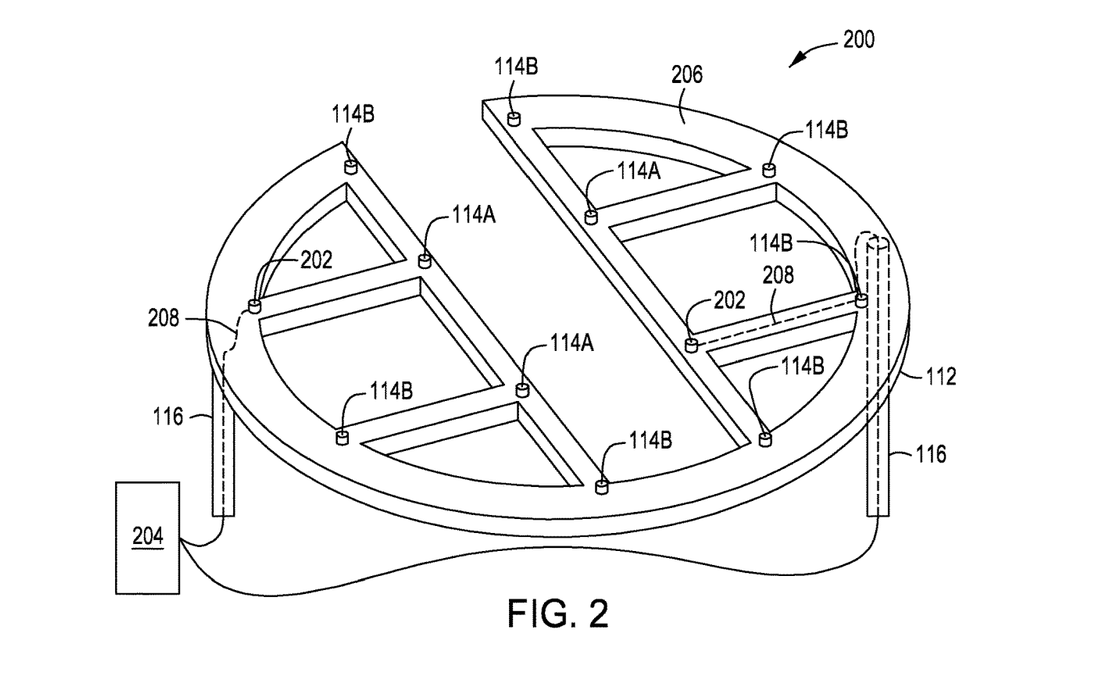
FIG. 2 depicts an isometric view of a substrate holder in accordance with some embodiments of the present principles.

FIG. 2 depicts an isometric view 200 of the substrate holder 112 in accordance with some embodiments. The substrate holder 112 has support pins 114 that hold a substrate off of an upper surface 206 of the substrate holder 112. In some embodiments, one or more of the support pins 114 are replaced with one or more temperature sensor assemblies 202. To ensure a uniform temperature across the substrate, one or more inner support pins 114A and one or more outer support pins 114B may be replaced with temperature sensor assemblies 202 as illustrated in FIG. 2. The one or more temperature sensors assemblies 202 interface with one or more optical transmission assemblies 208 that are embedded in channels (not shown in FIG. 2, see FIGS. 3-5, 7, and 8) in the substrate holder 112. The one or more optical transmission assemblies 208 may be revealed in the channels or may be concealed in the channels. The one or more temperature sensor assemblies 202 interface with one or more temperature detection assemblies 204 that convert optical information into digital and/or analog signal information for use by the controller 106. In some embodiments, the one or more temperature detection assemblies 204 may be remote from the one or more optical transmission assemblies 208 and/or are part of the controller 106. In some embodiments, the one or more optical transmission assemblies 208 are routed through the one or more support members 116 to the one or more temperature detection assemblies 204. In some embodiments, the one or more temperature detection assemblies 204 may be positioned on the substrate holder 112 to convert the optical transmission to a digital and/or analog signal before transmitting the converted signal to the controller 106.

Figure 3:
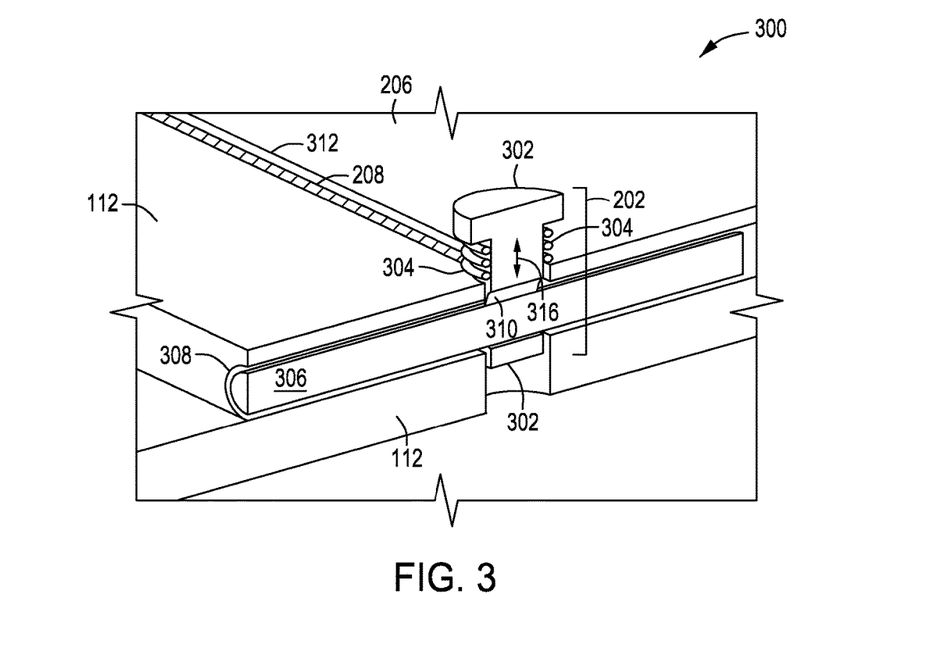
FIG. 3 depicts a cutaway isometric view of a temperature sensor assembly in accordance with some embodiments of the present principles.

FIG. 3 depicts a cutaway isometric view 300 of the temperature sensor assembly 202 in accordance with some embodiments. The temperature sensor assembly 202 includes a temperature sensor pin 302 with a spring 304. The temperature sensor pin 302 is held captive by a locking pin 306 that is inserted through a locking channel 308 in the substrate holder 112. The temperature sensor pin 302 has a slot 310 that accepts the locking pin 306 and prevents the temperature sensor pin 302 from coming out of the substrate holder 112 in response to the upward pressure of the spring 304. The spring 304 is configured to provide enough upward pressure to allow for sufficient thermal contact with the substrate and sufficient thermal transfer of heat from the substrate to the temperature sensor pin 302 to create light emissions from a phosphorous coating on the temperature sensor pin 302. The slot 310 is large enough to allow the temperature sensor pin 302 to move vertically 316 when a substrate is lowered onto the temperature sensor pin 302 to ensure proper thermal contact. The spring 304 also assists in compensating for substrates that are warped and the like. The optical transmission assembly 208 is shown embedded in a channel 312 of the substrate holder 112 that leads to a side portion of the temperature sensor pin 302 beneath the upper surface 206 of the substrate holder 112. In some embodiments, the temperature sensor pin 302 is formed from a microwave transparent material with a low thermal mass and a thermal conductivity greater than approximately 200 W/mK. In some embodiments, the spring 304 and/or locking pin 306 may be formed from a microwave transparent material such as, but not limited to, ceramic, PEEK, and the like.

Figure 4:
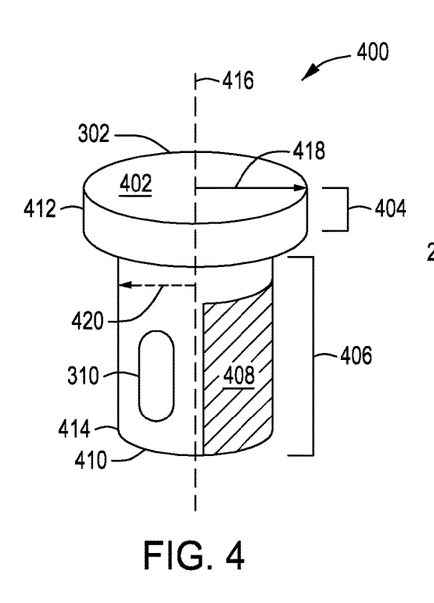
FIG. 4 depicts an isometric view of a temperature sensor pin in accordance with some embodiments of the present principles.
Figure 5:
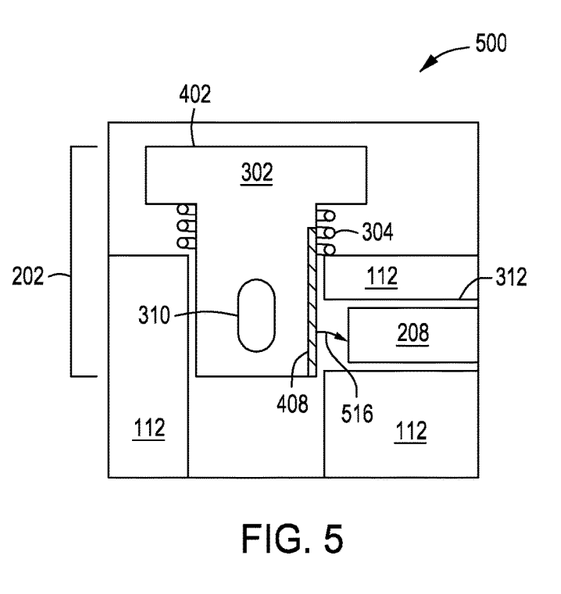
FIG. 5 depicts a cross-sectional view of a temperature sensor assembly and an optical transmission assembly in accordance with some embodiments of the present principles.

FIG. 4 depicts an isometric view 400 of a temperature sensor pin 302 in accordance with some embodiments. The temperature sensor pin 302 includes a first end 412 with a cap 404 and an upper surface 402 that is planar for thermally contacting a substrate when present. The temperature sensor pin 302 has a second end 414 distal from the first end 412 that includes a bottom surface 410. Below the cap 404 of the temperature sensor pin 302 is a body 406 with a second diameter 420 less than a first diameter 418 of the cap 404 measured from a central axis 416. A portion of the outer surface of the body 406 has a phosphorous coating 408 that facilitates in measuring the temperature of a substrate by the optical transmission assembly 208. The phosphorous coating 408 may be formed of a fluorescent material. FIG. 5 depicts a cross-sectional view 500 of a temperature sensor assembly 202 and an optical transmission assembly 208 in accordance with some embodiments. The optical transmission assembly 208 is configured to receive light emissions 516 from the phosphorous coating 408 on a portion of the side of the body of the temperature sensor pin 302. The phosphorous coating 408 is configured to cover enough of the side of the body to allow the optical transmission assembly 208 to receive light emissions when the temperature sensor pin moves vertically as a substrate is loaded onto the upper surface 402 of the temperature sensor pin 302.

Figure 6:
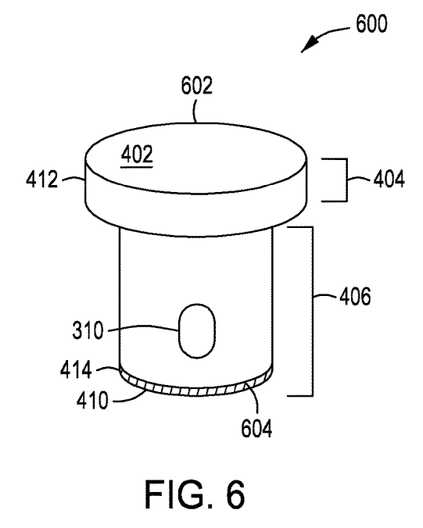
FIG. 6 depicts an isometric view of a temperature sensor pin in accordance with some embodiments of the present principles.
Figure 7:
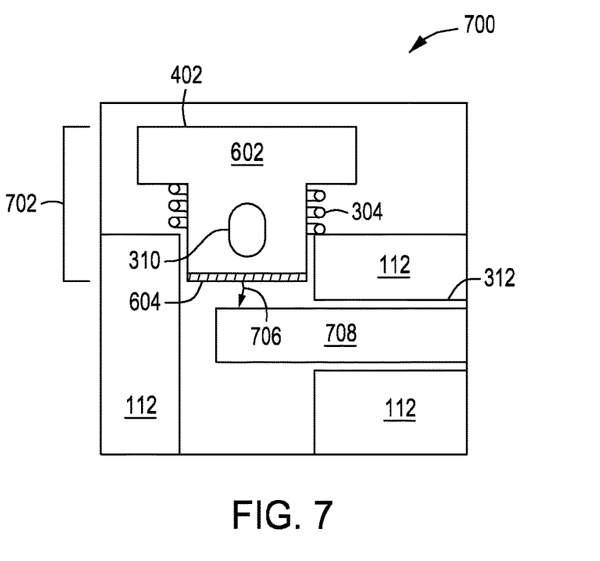
FIG. 7 depicts a cross-sectional view of a temperature sensor assembly and an optical transmission assembly in accordance with some embodiments of the present principles.

FIG. 6 depicts an isometric view 600 of a temperature sensor pin 602 in accordance with some embodiments. The temperature sensor pin 602 has a phosphorous coating 604 on the bottom surface 410 of the temperature sensor pin 602. The phosphorous coating 604 may be formed of a fluorescent material. In some embodiments, the temperature sensor pin 602 is formed from a microwave transparent material with a low thermal mass and a thermal conductivity greater than approximately 200 W/mK. FIG. 7 depicts a cross-sectional view 700 of a temperature sensor assembly 702 and an optical transmission assembly 708 in accordance with some embodiments. The optical transmission assembly 708 extends below the temperature sensor pin 602 and is configured to receive light emissions 706 from a phosphorous coating 604 on the bottom surface 410 of the temperature sensor pin 602. In some embodiments, the spring 304 may be formed from a microwave transparent material such as, but not limited to, ceramic, PEEK, and the like.

Figure 8:
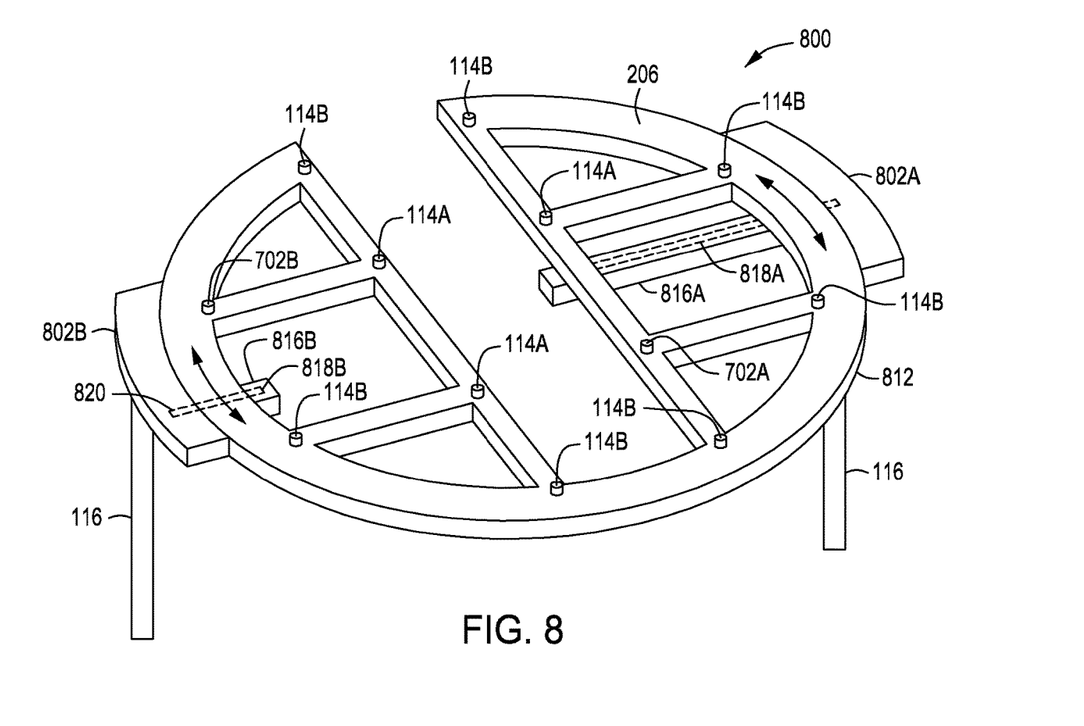
FIG. 8 depicts an isometric view of a rotating substrate holder in accordance with some embodiments of the present principles.

FIG. 8 depicts an isometric view 800 of a rotating substrate holder 812 in accordance with some embodiments. The rotating substrate holder 812 is supported by one or more stationary supports 802 that provide rotational motion to the rotating substrate holder 812. The stationary supports 802 may be held in position by one or more support members 116. A first optical transmission assembly 818A is embedded into a first stationary support 802A which has a first extension 816A that is configured to place the first optical transmission assembly 818A under a first temperature sensor assembly 702A in an inner area of the rotating substrate holder 812. The first extension 816A is configured such that the first temperature sensor assembly 702A passes over an end of the first optical transmission assembly 818A as the rotating substrate holder 812 rotates. A second optical transmission assembly 818B is embedded into a second stationary support 802B which has a second extension 816B that is configured to place the second optical transmission assembly 818B under a second temperature sensor assembly 702B in an outer area of the rotating substrate holder 812. The second extension 816B is configured such that the second temperature sensor assembly 702B passes over an end of the second optical transmission assembly 818B as the rotating substrate holder 812 rotates. In some embodiments, the first extension 816A and the second extension 816B may be part of a single stationary support.

Figure 9:
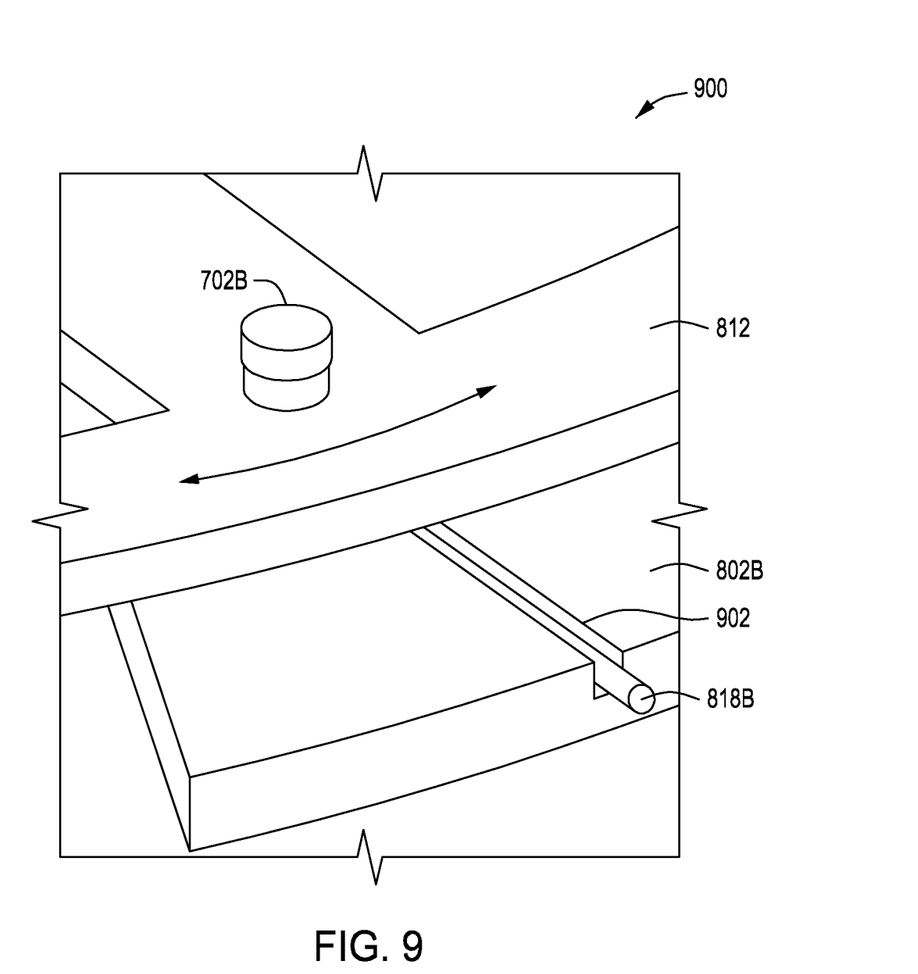
FIG. 9 depicts an isometric view of a rotating temperature sensor assembly and a stationary optical transmission assembly in accordance with some embodiments of the present principles.

FIG. 9 depicts an isometric view 900 of the second temperature sensor assembly 702B that rotates with the rotating substrate holder 812 and the second optical transmission assembly 818B that remains stationary with the second stationary support 802B in accordance with some embodiments. The second optical transmission assembly 818B is embedded in a channel 902 in the second stationary support 802B. The second optical transmission assembly 820 may be revealed in the channel 902 (as shown) or completely concealed in the channel 902. The second temperature sensor assembly 702B passes over an end of the second optical transmission assembly 8186 once for every revolution of the rotating substrate holder 812. When more than one temperature sensor assembly is used in an outer and/or inner region of the rotating substrate holder 812, an optical transmission assembly may receive multiple light emissions from the plurality of temperature sensor assemblies in that region for each revolution of the rotating substrate holder 812. In some embodiments, the rotating substrate holder 812 may rotate at approximately 5, 10, 30, or up to 60 revolutions per minute.

Embodiments in accordance with the present principles may be implemented in hardware, firmware, software, or any combination thereof. Embodiments may also be implemented as instructions stored using one or more computer readable media, which may be read and executed by one or more processors. A computer readable medium may include any mechanism for storing or transmitting information in a form readable by a machine (e.g., a computing platform or a "virtual machine" running on one or more computing platforms). For example, a computer readable medium may include any suitable form of volatile or non-volatile memory. In some embodiments, the computer readable media may include a non-transitory computer readable medium.

While the foregoing is directed to embodiments of the present principles, other and further embodiments of the principles may be devised without departing from the basic scope thereof.

The invention claimed is:

1. An apparatus for determining a temperature of a substrate, comprising:
   a substrate holder with a plurality of support pins configured to be placed in a microwave or vacuum environment;
   a temperature sensor assembly with at least a portion of its surface having a phosphorous coating and configured to be inserted in at least one pin support position in the substrate holder, wherein the temperature sensor assembly includes a temperature sensor pin with a spring that provides upward motion of the temperature sensor pin and is configured to enhance thermal contact with a warped substrate when present by providing an upward force against the substrate; and
   an optical transmission assembly embedded into at least a portion of the substrate holder or a static platform and configured to receive light emissions from the at least a portion of the surface of the temperature sensor assembly and to relay the light emissions to a temperature detection assembly.

2. The apparatus of claim 1, wherein the substrate holder is configured to be static during temperature detection.

3. The apparatus of claim 1, wherein the substrate holder is configured to rotate during temperature detection.

4. The apparatus of claim 1, wherein the static platform has an extension configured to position the optical transmission assembly under the temperature sensor assembly in an inner area of the substrate holder.

5. The apparatus of claim 1, wherein the temperature sensor pin is made of a material with a thermal conductivity greater than approximately 200 W/mK and a low thermal mass which is microwave transparent.

6. The apparatus of claim 1, wherein the at least a portion of the surface of the temperature sensor assembly includes a side surface of the temperature sensor assembly.

7. The apparatus of claim 1, wherein the at least a portion of the surface of the temperature sensor assembly includes a bottom surface of the temperature sensor assembly.

8. The apparatus of claim 1, wherein the optical transmission assembly is configured to intermittently obtain light emissions from the temperature sensor assembly.

9. The apparatus of claim 1, wherein the substrate holder and temperature sensor assembly are configured to be mounted on a rotating platform and the optical transmission assembly is configured to be mounted on the static platform, wherein the temperature sensor assembly is configured to pass over the optical transmission assembly as the substrate holder rotates.

10. The apparatus of claim 1, wherein the spring is a microwave transparent material.

11. The apparatus of claim 10, wherein the spring is made of a ceramic material.

12. The apparatus of claim 1, wherein the temperature sensor pin has a slot through a lower portion of the temperature sensor pin and is configured to be held in the substrate holder by a locking pin that inserts through the slot of the temperature sensor pin.

13. The apparatus of claim 12, wherein the locking pin is a microwave transparent material.

14. The apparatus of claim 13, wherein the locking pin is made of a ceramic material.

15. An apparatus for determining a temperature of a substrate, comprising:
  a substrate holder with a plurality of support pins configured to be placed in a microwave environment or a vacuum environment;
  a temperature sensor assembly with at least a portion of its surface having a phosphorous coating and configured to be inserted in at least one pin support position in an inner area of the substrate holder and in at least one pin support position in an outer area of the substrate holder, wherein the temperature sensor assembly includes a temperature sensor pin with a spring that is microwave transparent and provides an upward motion of the temperature sensor pin and is configured to enhance thermal contact with a warped substrate when present by providing an upward force against the substrate, and wherein the temperature sensor pin is made of a material with a thermal conductivity greater than approximately 200 W/mK and a low thermal mass which is microwave transparent; and
  an optical transmission assembly embedded into at least a portion of the substrate holder or a static platform and configured to receive light emissions from the at least a portion of the surface of the temperature sensor assembly and to relay the light emissions to a temperature detection assembly.

16. The apparatus of claim 15, wherein the substrate holder and temperature sensor assembly are configured to be mounted on a rotating platform and the optical transmission assembly is configured to be mounted on the static platform, wherein the temperature sensor assembly is configured to pass over the optical transmission assembly as the substrate holder rotates.

17. The apparatus of claim 15, wherein the temperature sensor pin has a slot through a lower portion of the temperature sensor pin and is configured to be held in the substrate holder by a locking pin that inserts through the slot of the temperature sensor pin, wherein the locking pin is made of a microwave transparent material.

18. The apparatus of claim 15, wherein the at least a portion of the surface of the temperature sensor assembly includes a side surface of the temperature sensor assembly or a bottom surface of the temperature sensor assembly.

19. An apparatus for heating a substrate with microwaves, comprising:
  a process chamber with a microwave power source and a microwave cavity, the process chamber capable of providing a vacuum environment for heating the substrate;
  a plurality of substrate holders with a plurality of support pins configured to be placed in the microwave cavity, the plurality of substrate holders configured to support a plurality of substrates;
  at least one temperature sensor assembly with at least a portion of its surface having a phosphorous coating and configured to be inserted in at least one pin support position in at least one of the plurality of substrate holders, wherein the at least one temperature sensor assembly includes a temperature sensor pin with a spring that provides upward motion of the temperature sensor pin and is configured to enhance thermal contact with a warped substrate when present by providing an upward force against the substrate;
  at least one optical transmission assembly embedded into at least a portion of the at least one of the plurality of substrate holders or a static platform and configured to receive light emissions from the at least a portion of the surface of the temperature sensor assembly and to relay the light emissions to a temperature detection assembly; and
  a controller configured to receive temperature information from the temperature detection assembly and to provide adjustments to the microwave power source based upon the temperature information and process information.

20. The apparatus of claim 19, wherein the process chamber is configured to process and detect temperatures of the plurality of substrates when at least one of the plurality of substrates is composed of a different material than another one of the plurality of substrates.

* * * * *